United States Patent [19]
Voss et al.

[11] 3,859,408
[45] Jan. 7, 1975

[54] METHOD FOR MAKING TUBULAR ARTICLES

[75] Inventors: Harold C. Voss, Denver; Leonard F. Hartford, Westminster, both of Colo.

[73] Assignee: The Gates Rubber Company, Denver, Colo.

[22] Filed: Jan. 29, 1973

[21] Appl. No.: 327,368

[52] U.S. Cl. ............ 264/89, 264/94, 264/98, 264/151, 264/159, 264/209, 425/302, 425/392
[51] Int. Cl. ............... B29c 17/07, B29c 17/14
[58] Field of Search ........... 264/88, 89, 93, 94, 98, 264/99, 148, 150, 159, 151, 209, 269, DIG. 52, 40, 236; 425/387, 392, 302, 296, 303

[56] References Cited
UNITED STATES PATENTS

| | | | |
|---|---|---|---|
| 1,537,860 | 5/1925 | Miller | 264/94 X |
| 2,320,564 | 6/1943 | Brooks | 264/94 |
| 2,742,669 | 4/1956 | Rhodes | 264/236 X |
| 2,903,743 | 9/1959 | Lysobey | 425/363 X |
| 2,994,923 | 8/1961 | Eddy | 264/150 X |
| 3,465,384 | 9/1969 | Barchi et al | 264/40 UX |

*Primary Examiner*—Jan H. Silbaugh
*Attorney, Agent, or Firm*—H. W. Oberg, Jr.; Raymond Fink; Curtis H. Castleman, Jr.

[57] ABSTRACT

A method for making tubular articles successively from a continuous length of heat setting tubular carcass by inserting a plug in one end portion of the carcass, sealing the end portion, and expanding the end portion against a generally tubular mold while simultaneously heat setting the end portion.

11 Claims, 5 Drawing Figures

PATENTED JAN 7 1975 3,859,408

METHOD FOR MAKING TUBULAR ARTICLES

BACKGROUND OF THE INVENTION

The invention relates to plastic and non-metallic article shaping or treating processes through direct application of fluid pressure to permanently shape, distort, or sustain work, but more particularly, the invention relates to applying pressure to the inside hollow of an end portion of a tubular carcass while simultaneously applying heat to set the carcass in an expanded position against a mold concavity.

Prior art methods for molding tubular products relating to subject matter of this invention generally fall within two categories. In both categories, a heat setting tubular carcass is formed by known methods such as fabrication or extrusion. The tubular carcass may include a reinforcement such as a twined textile or a calendered fabric. The tubular carcass is then cut into predetermined lengths. In processes of the first category the lengths are positioned within a mold cavity, the ends of the lengths are plugged, and pressure is applied internally to expand the pre-cut lengths of tubular carcass against internal walls of the mold. When a polymer such as rubber is used, heat is applied to the mold to vulcanize or cure the rubber. When a polymer such as plastic is used, the mold may be cooled to set the polymer in the configuration of the mold. Once set, the lengths are removed from the mold and the ends are again trimmed to remove a distorted portion of the set articles where the plugs where positioned. Examples of such processes appear in U.S. Pat. Nos. 2,897,840 and 2,780,273. A similar process using unreinforced pre-cut lengths is disclosed at page 49 in the 10/4/71 issue of *Design News*.

In methods of the second category, the pre-cut lengths are positioned over a mandrel, heat is applied, and the tubular carcass is set. The method is particularly used when making curved hose for automotive vehicles. The tubular carcass is usually of a natural or synthetic rubber and is curable or vulcanizable by application of heat. The mandrels over which the lengths are placed may be cured to any predetermined shape. Heat is applied to cure or vulcanize the tubular carcass to a shape having the configuration of the mandrel. After setting, the lengths are pulled off the mandrel. Usually, the tubular lengths are placed on and taken from the mandrel manually. Needless to say, it is oftentimes difficult to place and remove the tubular lengths on a mandrel having many compound curves or sharp angle bends. The said tubular lengths are post trimmed for accuracy.

SUMMARY OF THE INVENTION

In accordance with the invention, a method is provided for making tubular articles in a somewhat continuous manner from a continuous length tubular carcass. In a preferred embodiment, an end portion of the carcass is pulled into a generally tubular mold and a plug is inserted to a predetermined position within the carcass. The end is sealed and pressure is applied expanding the end portion against a mold concavity. The end portion is set such as by application of heat in the case of curable rubbers, or the mold is cooled such as in the case of thermal setting plastics. Once set the end portion is pulled longitudinally from the mold which simultaneously pulls a successive end portion into the mold for shaping and setting. If desired, the set end is cut from the carcass to define a finished article. Alternatively, a continuous length tubular article may be formed by avoiding the cutting step. Preferably, the set article is pulled from the mold cavity by some mechanical means. The method of the invention offers several advantages over the prior art. Neither pre-cutting of the tubular carcass prior to setting nor post trimming of the set tubular article is required in the process of the invention. Thus, large economical gains result. The process of the invention also lends itself to automation for further economical advantages.

These and further advantages or objects of the invention will become more apparent after reviewing the drawing and description thereof wherein.

DESCRIPTION OF PREFERRED EMBODIMENT

Figure 1:
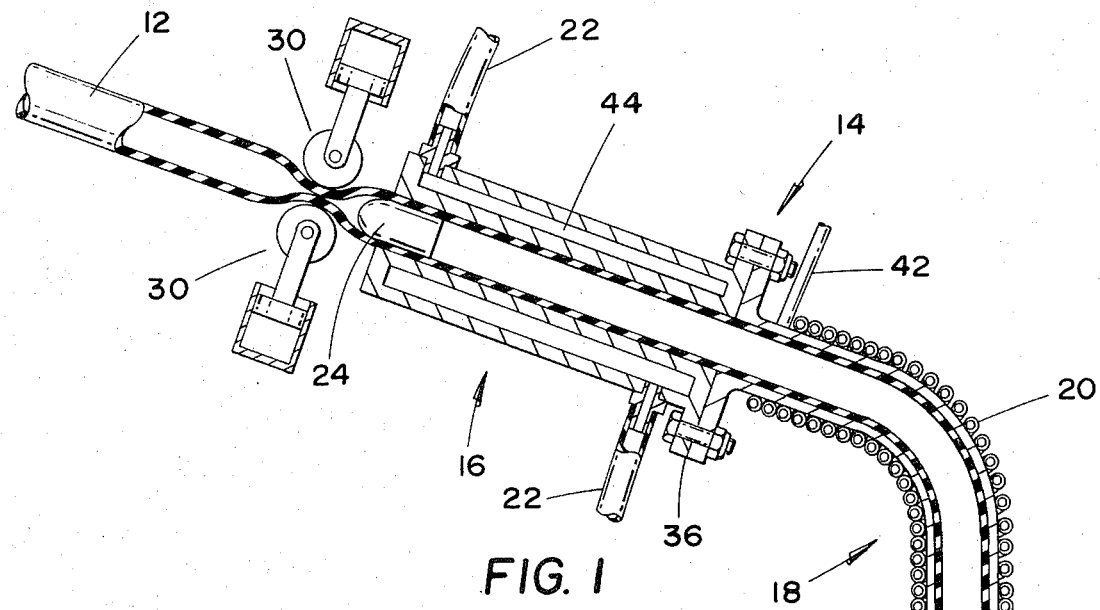
FIG. 1 is a schematic showing a tubular mold in longitudinal cross-section with a tubular carcass inserted therein.
Figure 2:
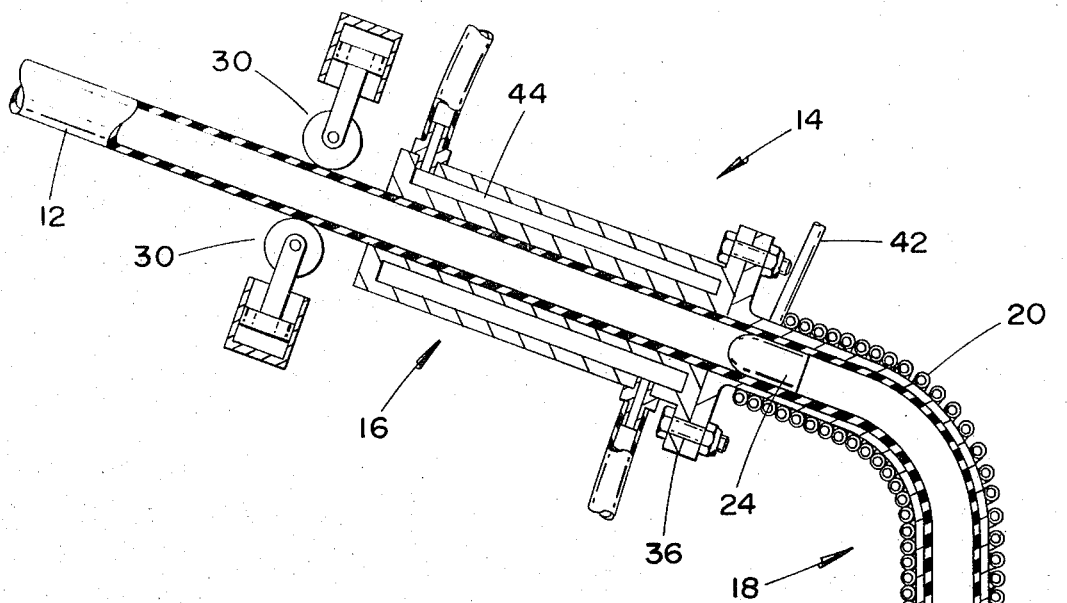
FIG. 2 is a view similar to FIG. 1 showing a set tubular article being pulled from the mold concavity.

Referring to FIGS. 1 and 2, the process of the invention is initiated by inserting one end portion 10 of a tubular carcass 12 into a molding apparatus 14. Tubular carcass is formed by known prior art methods. For example, tubular carcass may be fabricated by plying or spiralling strips of rubber and rubberized fabric over a mandrel, or by extruding a polymeric tubing; the extruded tube may then be reinforced with a twined material. The process of the invention is particularly adaptable for making curved hose of rubber or rubber-like material having or excluding a reinforcement. Accordingly, the preferred embodiments sets forth the process for making successive lengths of curved hose from a continuous length tubular carcass.

When a reinforcement is to be used it should be twined to have a sufficient degree of radial expansion as the article being cured is radially expanded in the mold concavity. A knit textile reinforcement exhibits the requisite amount of radial expansion. As is known in the art, other reinforcement means may be used to provide the necessary radial expansion.

To start the process, one end portion 10 of the tubular carcass 12 is inserted through the tubularly shaped mold 14. Preferably, the mold is divided into two sections, a sleeve 16 and a concavity 18. The sleeve 16 and concavity 18 are juxtaposed each other in longitudinal alignment. If desired the sleeve 16 and concavity 18 portions may be one piece. The concavity portion 18 of the mold defines the shape of the article to be molded. The concavity 18 may be made, for example, from bent tubing or from straight cylinders with interconnecting elbows. The tubular concavity may have any desired number of compound bends, but a concavity 18 with a simple bend is shown to illustrate the process. Preferably, the sleeve portion 16 is a generally straight tubular member.

The mold concavity portion preferably includes means 20 for heating, and the sleeve portion preferably includes means 22 for cooling when a tubular carcass such as of rubber is to be set by curing. However, the sleeve portion 16 is heated and the mold concavity 18 is cooled when a tubular carcass 12 of plastic or the like is to be set.

Once the tubular carcass 12 has been positioned within the mold 14, a floating or moveable plug 24 is placed in the tubular carcass in an area juxtaposed the sleeve. An end plug 26 is placed at the open end to seal the end portion 10 of the tubular carcass. The end plug 26 includes means 28 for pressurizing and heating the hollow of the tubular carcass. The floating plug 24 is easily blown into its proper position by sealing the opened end of the tubular carcass with the end plug 26 and pressurizing the tubular hollow. Restriction means 30 such as rollers are provided to collapse the tubular carcass 12 juxtaposed the sleeve 16 to prevent further movement of the floating plug 24 within the carcass. The floating plug seals 24 one portion of the carcass while the end plug 26 seals the open end.

Pressure is applied through the end plug 26 to expand the end portion 10 against the mold concavity 18. Heat is applied to set the carcass in an expanded position. The heat may be applied to the hollow of the tubular carcass, around the exterior of the mold cavity, or a combination of both. It is desirable to apply heat both to the inside of the tubular carcass through means 28 and the outside of the mold cavity through means 20 to hasten the curing cycle. The sleeve portion 16 of the mold prevents the uncured tubular carcass 12 from blowing up "like a balloon" or otherwise, contains the carcass. Optionally but preferably, coolant is circulated through cooling means 22 of the sleeve portion 16 to prevent the tubular carcass juxtaposed the sleeve from completely curing. As is known in the art, small rubber articles may be cured or vulcanized generally within 20 minutes when heated to approximately 180° F. Once the end portion 10 is cured, the restriction means 30 is relaxed (FIG. 2) and the end portion 10 is extracted longitudinally from the mold which simultaneously pulls that portion of the tubular carcass which was previously near the sleeve 16 into the mold cavity. Preferably, the end plug 26 is also used to pull the cured hose longitudinally from the mold. The hose 32 may be severed 34 from the carcass 12 either automatically or manually exteriorly of the mold. It is desirable to mold an indexing mark on the hose when the hose is to be manually cut.

When the hose 32 is pulled from the mold 14 the floating plug 24 is displaced with the hose as particularly shown in FIG. 2. The tubular carcass is again collapsed by the restriction means 30; the end plug 26 is reinserted; the end portion 10 of the carcass is pressurized which displaces the plug 24 against the restriction; and pressure and heat are applied to repeat the cycle of the process.

The force required to pull the cured hose 32 from the concavity 18 and a successive end portion into the concavity will of course vary with the number and complexity of bends. In some cases it is desirable to lubricate the outside of the tubular carcass to minimize the force required and prevent the uncured portion of the tubular carcass from being stretched. Likewise, to facilitate easy positioning of the floating plug 24 to its proper location, it may be desirable to lubricate the inside of the tubular carcass. It has been determined that mica dust works satisfactorily as a lubricant for the inside of the hose while a silicon lubricant works satisfactorily on the outside of the hose. Of course any desirable lubricant may be used that is compatible with the tubular carcass.

It is seen that as successive lengths of hose are cured, there are successive end portions about to enter the mold concavity that are partially cured. The partially cured section eases the problem of sealing and distorting the free end. Accordingly, to initially start the cycle it may be desirable to partially cure the end portion of the hose to avoid distortions that would require post trim. Only the first end portion need be partially cured as automatic partial curing of end portions will follow with the process.

ADDITIONAL SPECIES

Heretofore, the process of the invention has been explained in reference to heating the tubular carcass 12 for the purpose of setting the carcass as in making rubber hose articles. For articles of rubber, heating is required to cure or vulcanize the tubular article. However, in the case of plastics just the opposite is required to set the tubular article. It is necessary to pre-heat the polymer to somewhat plasticize the tubular carcass and then cool the carcass to set the article in position against the mold concavity. Thus, in some applications heat may be applied to the sleeve portion 16 whereas coolant may be applied to the cavity portion 18 of the mold. For the purpose of this disclosure the term "setting" is meant to include both heating, such as required for curing rubber, and cooling, such as required to harden some plastics.

Figure 3:
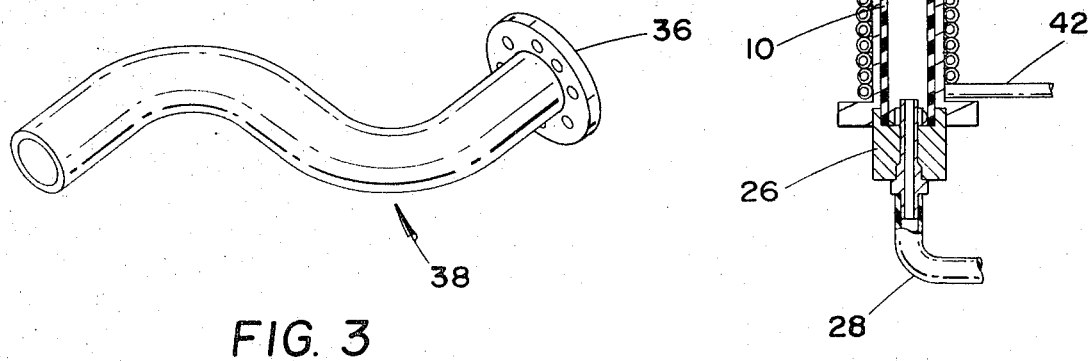
FIG. 3 is a view showing an alternate mold shape for the purpose of illustrating versatility of the process of the invention.

The mold concavity 18 is not restricted to that as shown in FIGS. 1 and 2. It is preferred to have the sleeve portion separable from the cavity portion to allow for different tubular article configurations. Separation of the sleeve and concavity may be easily achieved by means of flanges 36. Referring to FIG. 3 another example of a mold concavity portion 38 is shown. The concavity portion 38 includes several bends and a flange 36 for adapting to the sleeve portion 16 of FIG. 1.

The manner of heating and cooling the sleeve 16 and mold concavity portions 18, 38 is immaterial to the process of the invention. However, it has been found that water flowing through means 22 is a satisfactory way of cooling, and steam applied through a continuous tube 42 spirally wrapped around either the sleeve 16 or mold concavity 18 is an effective way of heating. Of course, separate chambers or autoclaves could be included for each portion. A jacket type heat exchanger 44 is convenient for straight sections. The sleeve portion of the mold is not absolutely required. However, the sleeve portion eliminates post trimming the set article in some applications such as when rubber hose is made.

The process of the invention may be used in lieu of prior art processes falling in three categories while simultaneously offering reduced process steps and economical advantages. As explained above, the process of the invention is used instead of the prior art process category of curing a rubber tubular carcass over a curved mandrel to form curved hose for use in automotive type vehicles.

Figure 4:
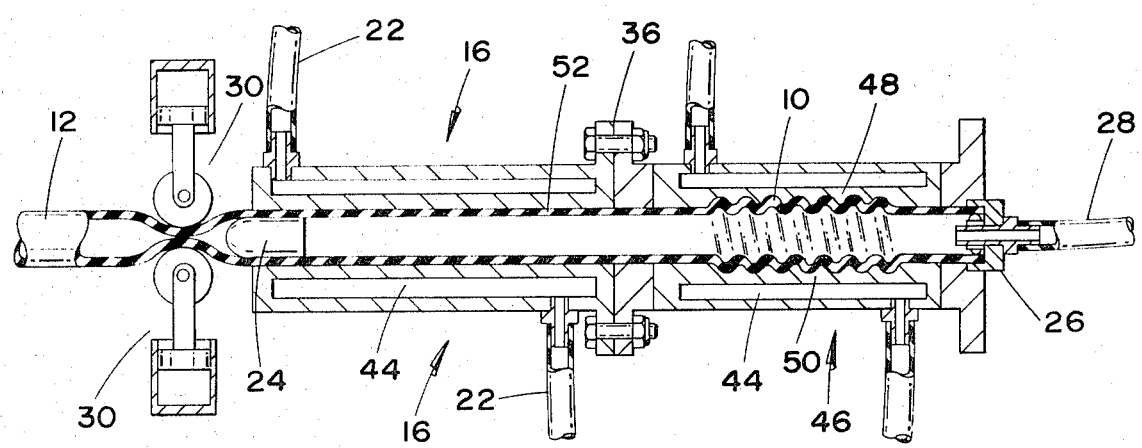
FIG. 4 is a view similar to FIG. 1 showing an alternate form of the invention.

The process is also suitable for making flexible corrugated hose in the category as disclosed in U.S. Pat. No. 2,897,840. Referring to FIG. 4, molding apparatus is used similar to that as previously disclosed. The mold is open-ended and includes sleeve 16 and concavity 46 portions. The concavity portion 46 is of the two 48, 50 or more part sectional type that may be opened and closed by known means and include one or more end-to-end cavities for setting more than one hose article at a time. The sleeve portion 16 may also be in sections but it is preferably tubular for simplicity. As before, the initial step involves inserting a tubular carcass 12 into the mold. When used, the carcass reinforcement must have capability for radial expansion to permit expansion into the mold concavity. For example, an overlapped square woven bias fabric or a loose knit reinforcement may be used. The end is sealed with an end plug 26 and the floating plug 24 is positioned to a predetermined portion juxtaposed the sleeve. Internal pressure is applied radially expanding the end portion 10 against the mold concavity 46 and the carcass is set. The mold concavity 48, 50 is opened or separated and the set article is pulled from the mold which automatically inserts a successively connected end portion into the mold. The finished article is severed from the tubular carcass and the cycle is repeated. Here it should be noted that when a rubber tubular carcass is used, each successive end 52, near the sleeve 16, is partially or totally cured. The cured end permits an effective seal to be made with the end plug 26 with little or no imperfections being introduced into the end. The floating plug 24 and sleeve 16 coact to seal the uncured portion of the tubular carcass 12 from the mold cavity. Neither the cured end near plug 26 nor the uncured portion juxtaposed the sleeve 16 are subject to permanent deformations that would require post trimming from the finished article. In prior art processes, lengths of pre-cut uncured ends must be used to seal the hollow of the carcass from the mold cavity while the tubular article is set. The uncured ends become fluid in the curing process and are set in their sealing position which is typically a deformed position. Thus, it is seen the process of the invention eliminates two uneconomical steps from prior art processes; namely; (1) pre-cutting tubular carcass to fit within a mold; and (2) post trimming deformations from set tubular articles resulting from sealing uncured polymer directly against a mold concavity.

The process of the invention is further suitable as a replacement for the lead curing process used for vulcanizing continuous lengths of rubber hose. During the lead process, billets of lead are melted and extruded to form a sheath around an uncured tubular carcass. The carcass is internally expanded against the lead sheath, and cured using steam. The lead is removed and re-melted into billets and the cycle repeated. Air pockets are sometimes formed in the billets which results in deformations in the lead sheath and correspondingly, in the finished product. Any entrapped water introduced between the lead sheath and tubular carcass also introduces irregularities into the hose as it is cured. The process of the invention eliminates deformations caused by air pockets or entrapped water while simultaneously eliminating the lead process steps of: billeting, extruding, removing, and re-melting the lead.

Figure 5:
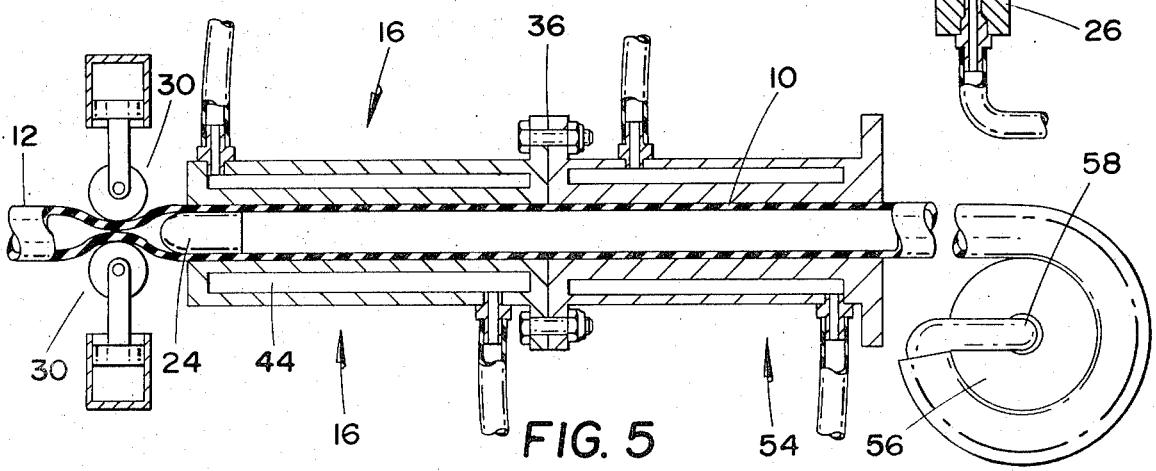
FIG. 5 is a view similar to FIG. 1 showing an alternate form of the invention.

Long or continuous lengths of straight tubular articles are made using a mold that includes a tubular sleeve and a tubular mold concavity. When specific lengths of tubular articles are desired, the mold concavity length may be made equal to the desired article length and the process as heretofore described for curved may be used. When the length of the tubular product is to be greater than the length of the mold concavity, an alternate procedure is used. Referring to FIG. 5, the process is initialed as previously described. An end portion 10 of the tubular carcass 12 is inserted into the mold, the floating plug 24 is positioned juxtaposed the restriction 30. The open end of the carcass is plugged and sealed and the carcass is cured. The restriction is released and the set end portion is pulled from the mold which simultaneously inserts a successively connected portion of tubular carcass and the floating plug into the concavity. The end plug 24 is retained in position, after the connected portion of carcass is pulled into the mold concavity. The hollow of the carcass is pressurized to reposition the floating plug 24 and expand the unset carcass against the mold concavity 54. The portion of carcass in the mold concavity is set and the cycle is repeated until the desired length of continuous hose has been cured. Preferably, the cured portion of the hose is wound on reels 56 which also double for the purpose of pulling successive sections of cured hose from the mold. The reel includes a swivel type pressure fitting 58 for connecting the reeled end plug to a stationary pressure source.

The foregoing description was made for purposes of illustration only and is not intended to limit the scope of the invention which is to be determined from the appended claims.

What is claimed is:

1. A method of molding successively adjacent flexible tubular articles from a continuous length of reinforced, temperature setting tubular carcass comprising the steps of:

inserting a first end portion of the tubular carcass in an open end, generally tubular cross-sectional mold that includes a sleeve portion with a tubular carcass receiving opening and a cavity portion with an article exit opening;

sealing the first end portion of the tubular carcass near the article exit opening;

internally pressurizing the tubular carcass while simultaneously: positioning a movable plug in the hollow of the tubular carcass juxtaposed the sleeve, sealing the hollow of the tubular carcass at the movable plug and expanding the first end portion radially outward against the cavity portion effecting article shaping;

setting the tubular carcass disposed in the cavity portion and at least partially setting a successively connecting portion of the tubular carcass;

relieving the internal pressure;

pulling the set portion of the tubular carcass from the mold while simultaneously pulling successively connected portions of the tubular carcass into the sleeve portion and mold portion and positioning the at least partially cured portion of the tubular carcass near the article exit opening;

severing the set portion from the tubular carcass to define a mold set tubular article of predetermined finished length; and sealing the at least partially set portion of tubular carcass at the article exit opening and repeating the above steps starting with pressurizing whereby successively adjacent tubular articles are molded and set from tubular carcass without interim waste of the tubular carcass.

2. A method of molding as set forth in claim 1 and further including prior to the step of inserting a first end portion, the step of:
partially setting a predetermined length of the first end portion.

3. A method of molding as set forth in claim 1 and further including simultaneously with the step of setting the tubular carcase, the step of:
heatsinking the sleeve.

4. A method of molding as set forth in claim 1 and further including prior to the step of inserting a first end portion, the step of:
lubricating the outside of the tubular carcass.

5. A method of molding as set forth in claim 1 and further including before the step of inserting a first end portion, the step of:
lubricating the inside of the tubular carcass.

6. A method of molding as set forth in claim 1 and further including simultaneously with the step of setting the tubular carcass, the step of:
molding index marks on the outside of the tubular carcass.

7. A method of molding as set forth in claim 1 and further including prior to the step of sealing the first end portion, the step of:
inserting the movable plug in the first end portion.

8. A method of molding as set forth in claim 1 and further including the step of injecting steam into said end portion during setting the tubular carcass.

9. A method of molding as set forth in claim 1 comprising bending the tubular carcass while pulling it into the mold portion.

10. A method of molding as set forth in claim 1 comprising curving the tubular carcass while radially expanding the tubular carcass against the cavity portion.

11. A method of molding as set forth claim 1 and further including prior to the step of pressurizing the end portion, the steps of collapsing the tubular carcass adjacent the sleeve portion and restricting movement of the plug at the sleeve.

* * * * *